United States Patent
Hough (10) Patent No.: US 9,852,324 B2
(45) Date of Patent: Dec. 26, 2017

(54) INFRARED IMAGE BASED FACIAL ANALYSIS

(71) Applicant: Intel Corporation, Santa Clara, CA (US)

(72) Inventor: Paul F. Hough, Shannon (IE)

(73) Assignee: Intel Corporation, Santa Clara, CA (US)

( * ) Notice: Subject to any disclaimer, the term of this patent is extended or adjusted under 35 U.S.C. 154(b) by 85 days.

(21) Appl. No.: 14/962,999

(22) Filed: Dec. 8, 2015

(65) Prior Publication Data

US 2017/0161548 A1    Jun. 8, 2017

(51) Int. Cl.
G06K 9/00    (2006.01)
H04N 5/33    (2006.01)

(52) U.S. Cl.
CPC ..... *G06K 9/00234* (2013.01); *G06K 9/00255* (2013.01); *G06K 9/00261* (2013.01); *G06K 9/00281* (2013.01); *H04N 5/332* (2013.01)

(58) Field of Classification Search
CPC ...... G06K 9/00268; G06T 2207/30201; G06T 2207/30196; G06T 2207/10048; G06T 2207/30088; G06T 7/0012
See application file for complete search history.

(56) References Cited

U.S. PATENT DOCUMENTS

| | | | |
|---|---|---|---|
| 5,163,094 A | 11/1992 | Prokoski et al. | |
| 6,173,068 B1 | 1/2001 | Prokoski | |
| 7,027,619 B2 | 4/2006 | Pavlidis et al. | |
| 7,602,942 B2 | 10/2009 | Bazakos et al. | |
| 7,899,218 B2 | 3/2011 | Satoshi | |
| 8,010,402 B1 | 8/2011 | Sharma et al. | |
| 8,406,482 B1 | 3/2013 | Chien et al. | |
| 8,489,459 B2 | 7/2013 | Vallier et al. | |
| 2005/0020924 A1* | 1/2005 | Mitra | A61B 5/015 600/474 |
| 2006/0102843 A1 | 5/2006 | Bazakos et al. | |

(Continued)

FOREIGN PATENT DOCUMENTS

WO    WO2006-003612 A1    1/2006

OTHER PUBLICATIONS

International Search Report and Written Opinion dated Dec. 20, 2017 for International Application No. PCT/US2016/059545, 13 pages.

(Continued)

*Primary Examiner* — Eueng-Nan Yeh
(74) *Attorney, Agent, or Firm* — Schwabe, Williamson & Wyatt, P.C.

(57) ABSTRACT

Apparatuses, systems and methods associated with infrared image based facial analysis are disclosed herein. In embodiments, an apparatus may include one or more processors and facial analysis circuitry to be operated by the one or more processors. The facial analysis circuitry may receive an infrared image of a subject from an infrared capture device and may identify a plurality of analysis regions of the infrared image, wherein the plurality of analysis regions correspond to portions of a face of the subject. The facial analysis circuitry may further determine respective mean temperatures of the plurality of analysis regions and determine a skin tone of the subject based, at least in part, on the respective mean temperatures of the plurality of analysis regions.

21 Claims, 5 Drawing Sheets

(56) References Cited

U.S. PATENT DOCUMENTS

| | | |
|---|---|---|
| 2007/0073799 A1 | 3/2007 | Adjali et al. |
| 2007/0274572 A1 | 11/2007 | Nishino |
| 2010/0177929 A1* | 7/2010 | Kurtz ................ G06K 9/00228 |
| | | 382/103 |
| 2011/0299771 A1 | 12/2011 | Cheddad et al. |
| 2012/0257826 A1 | 10/2012 | Kim et al. |

OTHER PUBLICATIONS

Trenton D. Mize et al., "Exploring Racial Differences on the Measurement and Experience of Emotion", 2010, 21 pages, University of Georgia.

* cited by examiner

INFRARED IMAGE BASED FACIAL ANALYSIS

TECHNICAL FIELD

The present disclosure relates to the field of facial detection. More particularly, the present disclosure relates to the utilization of infrared technology to improve facial detection.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Facial recognition systems have developed, allowing identification of characteristics and identities of individuals from a single image. While facial recognition continues to become more reliable, there still exist challenges to achieving reliable determinations and a certain amount of errors in facial recognition are expected. In particular, one challenge that continues to result in facial recognition is physical and other difference detectable differences in individuals of different races or skin tones that may not be properly compensated for in facial recognition systems.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatuses, methods and storage medium associated with facial recognition through utilization of an infrared image are disclosed herein. In embodiments, an apparatus may include one or more processors, devices, and/or circuitry to determine a skin tone of a subject captured within the infrared image based on a determined mean (average) temperature of the subject's face. The determined skin tone may supplement other existing vectors utilized in facial detection algorithms to improve determinations of characteristics of the subject, such as age, gender, race and identity.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," "in some embodiments," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
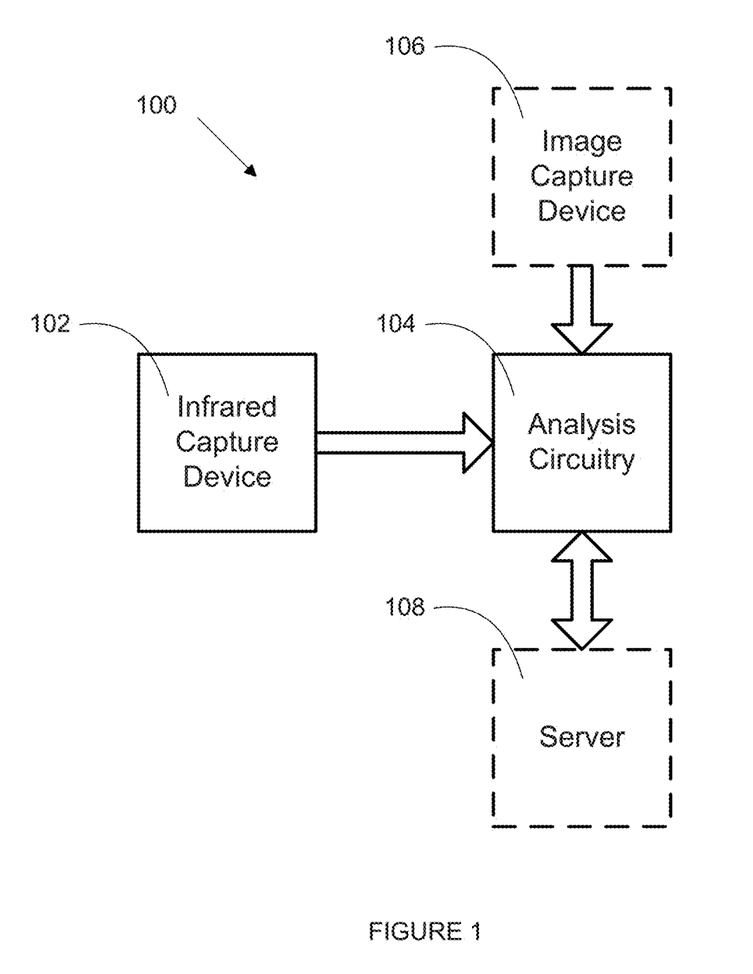
FIG. 1 illustrates an example system for facial recognition, according to various embodiments.

Referring now to FIG. 1, wherein an example system 100 for facial recognition, according to various embodiments, is shown. The system 100 may include an infrared capture device 102 and analysis circuitry 104 coupled to the infrared capture device 102.

The infrared capture device 102 may include any device that may be used for capturing infrared images, such as an infrared camera. The infrared capture device 102 may detect heat radiating from an object captured by the infrared capture device 102 and may produce an infrared (thermal) image based on the detected heat. The infrared image may include a plurality of pixels, each pixel may have one or more associated values representing an amount of heat radiating from a corresponding location within the infrared image. The plurality of pixel values may be different colors and/or different intensities of one or more colors based on the heat radiating from the corresponding location.

In embodiments, the infrared capture device 102 may be directed to capture an infrared image of a subject (person). The infrared capture device 102 may capture an entirety of the subject or a portion of the subject, such as a face of the subject. The infrared capture device 102 may generate an infrared image of the subject and any surroundings within a capture area of the infrared capture device 102. The infrared image captured by the infrared capture device 102 may be transmitted to and/or retrieved by the analysis circuitry 104. The analysis circuitry 104 may perform analysis of the image captured by the infrared capture device 102 to determine characteristics associated with the subject.

The analysis circuitry 104 may be located within the infrared capture device 102, may be located in a device separate from infrared capture device 102, or may be located within a device encompassing both the analysis circuitry 104 and the infrared capture device 102. In particular, the analysis circuitry 104 may be located in a computing device to receive the infrared image of the subject and perform analysis on the infrared image. The analysis circuitry 104 may determine characteristics of the subject based on the analysis of the infrared image.

In some embodiments, the system 100 may include another image capture device 106. The image capture device 106 may be located separate from the infrared capture device 102 or may be located in a device that encompasses both the infrared capture device 102 and the image capture device 106. In some embodiments, the infrared capture device 102 and the image capture device 106 may capture the images corresponding to each of the infrared capture device 102 and the image capture device 106 through a same aperture of the device encompassing both of the infrared capture device 102 and the image capture device 106, the aperture being directed toward the image which is intended to be captured.

The image capture device 106 may be directed to capture an image of the same subject captured by the infrared capture device 102. The image capture device 106 may be directed to capture the image of the same subject from an approximately same perspective and at an approximately same moment as the infrared capture device 102. In other embodiments, the image capture device 106 may be directed to capture the image of the same subject from a different perspective and/or at a different time than the infrared capture device 102.

The image capture device 106 may include an optical camera. The image capture device 106 may capture a visible spectrum image, a black and white image, a sepia image, other similar images, or some combination thereof, of the subject. In some embodiments, the image capture device 106 may capture a three-dimensional image of the subject.

The image captured by the image capture device 106 may be transmitted to and/or retrieved by the analysis circuitry 104. The analysis circuitry 104 may perform analysis of the image captured by the image capture device 106 to determine characteristics associated with the subject. Further, the analysis circuitry 104 may combine the analysis results of the infrared image and the image captured by the image capture device 106 and/or may analyze the infrared image and the image captured by the image capture device 106 together to determine characteristics associated with the subject.

In some embodiments, the system 100 may include a server 108 coupled to the analysis circuitry 104. The server 108 may include a database including stored images of the subject, stored images of other subjects, data associated with the subject, data associated with other subjects, or some combination thereof. Further, the server 108 may be able to receive images and/or data from the analysis circuitry 104 and supplement the database with the received images and/or data. The server 108 may be locally co-located with analysis circuitry 104, or may be remotely disposed, coupled with analysis circuitry 104 via one or more local and/or wide area wired and/or wireless networks.

The analysis circuitry 104 may access the server 108 and retrieve images and/or data from the server 108 that may be utilized in the analysis of the infrared image captured by the infrared capture device 102. For example, the analysis circuitry 104 may query the server for images with similar characteristics, such as skin tone and/or mean facial temperature, to the infrared image and utilize the images in analysis performed by the analysis circuitry 104 on the infrared image. The analysis performed by the analysis circuitry 104 may include performing a comparison of the infrared image with the retrieved images and/or images to determine characteristics of the subject captured in the infrared image.

The analysis circuitry 104 may store results of the analysis of the infrared image and/or the image captured by the image capture device 106 on the server 108 or other local and/or remote non-volatile storage medium. The results may be stored in the database on the server 108 or other local and/or remote non-volatile storage medium, and/or may be stored in a separate database associated with the analysis circuitry 104. The stored results may be later accessed by the analysis circuitry 104 and/or some other device coupled to the server 108 or the other local and/or remote non-volatile storage medium (hereinafter, simply server 108).

In some embodiments, the system may include both the image capture device 106 and the server 108. In these embodiments, the features described in relation to the image capture device 106 and the server 108 may both be present. For example, the analysis circuitry 106 may receive an image from the image capture device 106 and may retrieve data and/or other images from the server 108 to utilize in performing analysis of the image from the image capture device 106 to supplement the analysis of the infrared image.

Figure 2:
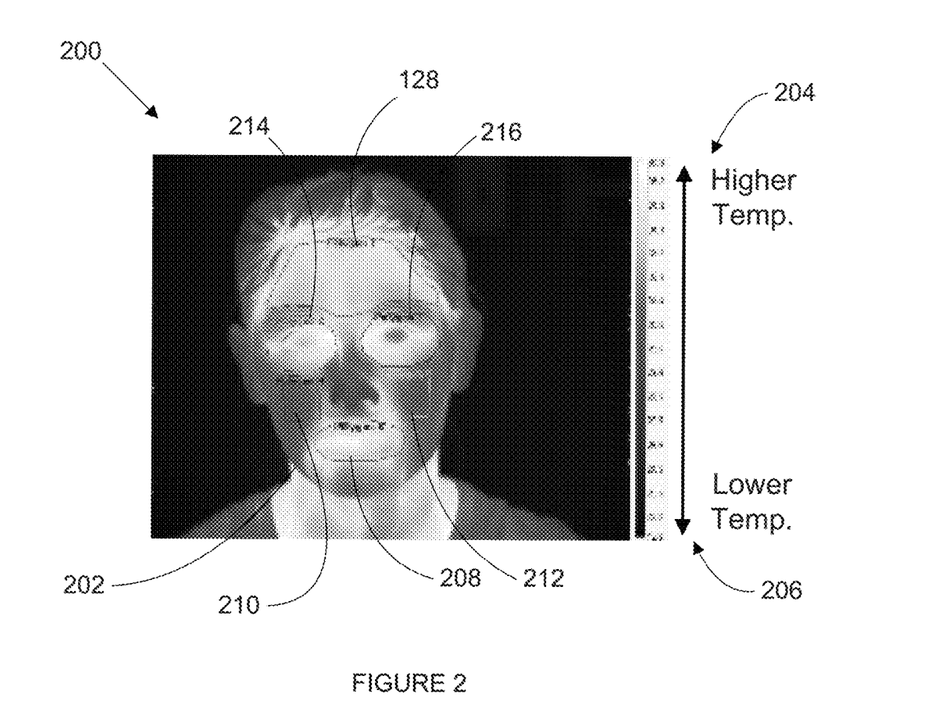
FIG. 2 illustrates an example infrared image for facial recognition, according to various embodiments.

Referring now to FIG. 2, an example infrared image 200 for facial recognition, according to various embodiments, is shown. The infrared image 200 may be captured by an infrared capture device, such as the infrared capture device 102 of FIG. 1. The infrared image 200 may indicate higher temperatures 204 in white and/or light colors and lower temperatures 206 in black and/or dark colors. In other embodiments, a first color may indicate higher temperatures 204 and a second color may indicate lower temperatures 206, wherein certain combinations of the first color and the second color indicate temperatures between the higher temperatures 204 and the lower temperatures 206.

The infrared image 200 may include an image of a subject 202. Analysis circuitry, such as analysis circuitry 104 of FIG. 1, may be able to identify the subject 202 from the surroundings based on differences in temperature between adjacent pixels within the infrared image 200, data acquired from another image (such as the image captured by image capture device 106 of FIG. 1), other data, other methods of determining an outline of the subject 202, or some combination thereof. Further, the analysis circuitry may be able to identify a face of the subject 202, physical features of the subject 202, or some combination thereof, through similar procedures for identifying the subject 202 from the surroundings.

The analysis circuitry may identify and/or define one or more physical features and/or regions corresponding to the subject 202 for which certain analysis is to be performed by the analysis circuitry. For example, the analysis circuitry may identify a region 208 corresponding to the subject's mouth, two regions 210, 212 corresponding to the subject's cheeks, two regions 214, 216 corresponding to the subject's eyes, and a region 218 corresponding to the subject's forehead. The features and/or regions may be identified and/or defined based on an outline of the subject, an outline of the subject's face, certain physical features of the subject, or some combination thereof.

The analysis circuitry may determine a mean temperature for each of the one or more features and/or regions of the subject 202. For example, the analysis circuitry may sum the temperatures of the pixels within the region 218 corresponding to the forehead of the subject 202 and then divide the sum by the number of pixels within the region 218 to generate a mean temperature for the region 218. The analysis circuitry may determine a mean temperature of the face of the subject 202 based on all or a portion of the mean temperatures for each of the one or more features and/or regions corresponding to the subject 202.

The analysis circuitry may further determine that the mean temperature calculation should be performed for a portion of the features and/or regions corresponding to the subject 202 and should not be performed for another portion of the features and/or regions. For example, the analysis circuitry may determine that the mean temperature calculation should be performed for the regions 210 and 212 corresponding to the subject's cheeks and the region 218 corresponding to the subject's forehead since these regions correspond to portions of the subject's skin. Further, the analysis circuitry may determine that the mean temperature calculation should not be performed for the region 208 corresponding to the subject's mouth and the regions 214 and 216 corresponding to the subject's eyes since these regions include the subject's lips and eyes, which may exhibit outlying mean temperatures due to these physical features.

The analysis circuitry may utilize the determined mean temperature of the subject's face and/or the determined mean temperatures of the features and/or regions to determine a skin tone of the subject 202, skin tones of the certain features and/or regions, or some combination thereof. The analysis circuitry may determine that higher mean temperatures correspond to lighter skin tones and lower mean temperatures correspond to darker skin tones. Accordingly, the analysis circuitry may determine subject 202 has a certain skin tone and/or portions of the subject 202 have certain skin tones based on the determined mean temperatures.

In some embodiments, the determined mean temperature of the subject's face may be compared with a reference mean temperature associated with a known skin tone. A difference between the determined mean temperature of the subject's face and the reference mean temperature associated with the known skin tone may be used for determining the subject's skin tone relative to the known skin tone.

The analysis circuitry may determine a race and/or ethnicity of the subject 202 or a predicted race and/or ethnicity of the subject based on the determined skin tone of the subject 202. For example, the analysis circuitry may determine that a subject with a lighter skin tone is Caucasian or European based on the subject's skin tone and may determine another subject with a darker skin tone is black or Zimbabwean based on the subject's skin tone.

In some embodiments, the determined skin tone of the subject 202 may be utilized as a vector within a facial recognition algorithm that utilizes additional vectors for determining characteristics of the subject 202. The additional vectors may include the subject's hair length, the subject's hair color, detected wrinkles of the subject 202, other distinctive features of the subject 202, or some combination thereof. The characteristics may include an age of the subject 202, a gender of the subject 202, a race and/or ethnicity of the subject 202, a health of the subject 202, an identity of the subject 202, other similar characteristics, or some combination thereof.

Figure 3:
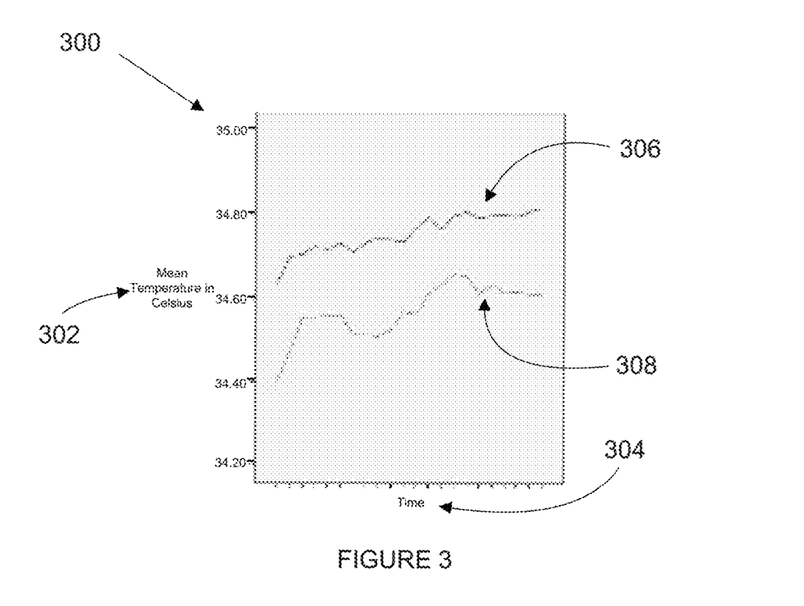
FIG. 3 illustrates an example mean facial temperature plot, according to various embodiments.

Referring now to FIG. 3, an example mean facial temperature plot 300, according to various embodiments, is shown. The mean facial temperature plot 300 may illustrate a mean facial temperature 302 in degrees Celsius for two different subjects over a period of time 304. The mean facial temperatures of each of the two different subjects may have been obtained by any of the systems and/or methods described throughout this disclosure, including the system 100 of FIG. 1 and/or the method described in relation to the infrared image 200 of FIG. 2. An infrared image corresponding to the first subject and an infrared image corresponding to the second subject may have been analyzed by analysis circuitry, such as analysis circuitry 104 of FIG. 1 and/or the analysis circuitry discussed in relation to the infrared image 200 of FIG. 2, to contribute to the production of the mean facial temperature plot 300.

The mean facial temperature plot 300 includes a first trend line 306 associated with a first subject and a second trend line 308 associated with a second subject. The first subject may have a lighter skin tone than the second subject. Accordingly, the first trend line 306 may indicate that a mean facial temperature of the first subject is higher than a mean facial temperature of the second subject, indicated by the second trend line 308, over the period of time 304. The mean facial temperature indicated by the first trend line 306 may range from approximately 34.6 degrees Celsius at the beginning of the period of time 304 to approximately 34.8 degrees Celsius, whereas the mean facial temperature indicated by the second trend line 308 may range from approximately 34.4 degrees Celsius at the beginning of the period of time 304 to approximately 34.6 degrees Celsius.

Analysis circuitry, such as analysis circuitry 104 of FIG. 1 and/or the analysis circuitry discussed in relation to the infrared image 200 of FIG. 2, may output a mean facial temperature plot similar to the mean facial temperature plot 300, which may be utilized for facial recognition analysis. The analysis circuitry may generate the mean facial temperature plot with a trend line corresponding to an infrared image captured by an infrared capture device, such as the infrared capture device 102 of FIG. 1, multiple trend lines corresponding to multiple different images captured by the infrared capture device, multiple trend lines corresponding to images and/or data retrieved from a server, such as the server 108 of FIG. 1, or some combination thereof. The mean facial temperature plot may be output in lieu of or in addition to the determination of the subject's skin tone, allowing for a visual representation of the data.

Figure 4:
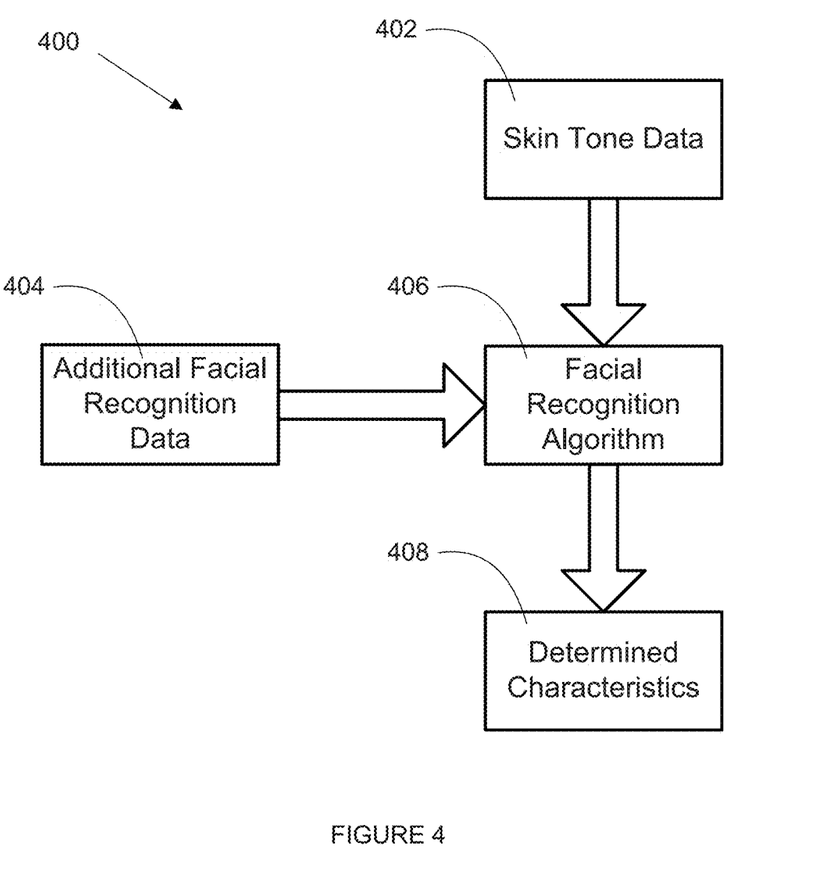
FIG. 4 illustrates an example facial recognition arrangement, according to various embodiments.

Referring now to FIG. 4, an example facial recognition arrangement 400, according to various embodiments, is shown. The facial recognition arrangement 400 may include a facial recognition algorithm 406. The facial recognition algorithm 406 may be performed by an analysis circuitry, such as analysis circuitry 104 of FIG. 1. The facial recognition algorithm 406 may take as inputs skin tone data 402 and additional facial recognition data 404 and output determined characteristics 408. The facial recognition algorithm 406 may assign different weights to inputs received and may perform analysis, calculations and/or manipulations with the inputs to generate the determined characteristics 408.

The skin tone data 402 may include the skin tone of a subject being analyzed. The skin tone data 402 may be generated through any of the methods and/or by any of the systems described throughout this disclosure, including by the methods described in relation to the analysis circuitry 104 of FIG. 1 or performed by the analysis circuitry 104, by the methods described in relation to the infrared image 200 of FIG. 2, or by the methods described in relation to the mean facial temperature plot 300 of FIG. 3. The skin tone data 402 may be represented by a number, symbol, signal and/or any other designation that may be associated with a certain skin tone.

The additional facial recognition data 404 may include any data generated through analysis of an image captured by an image capture device, such as the image capture device 106, any data retrieved from a computing device, server, and/or database, such as the server 108 of FIG. 1 and/or the database located on the server 108, any similar data associated with the subject being analyzed or other subjects, or some combination thereof. The additional facial recognition data 404 may be represented by a number, symbol, signal and/or any other designation that may be used to indicate the data.

The determined characteristics 408 may include any characteristics that may be determined concerning a subject being analyzed based on the skin tone data 402 and the additional facial recognition data 404. The determined characteristics may include an age of the subject, a gender of the subject, a race and/or ethnicity of the subject, a health of the subject, an identity of the subject, other similar characteristics, or some combination thereof.

Figure 5:
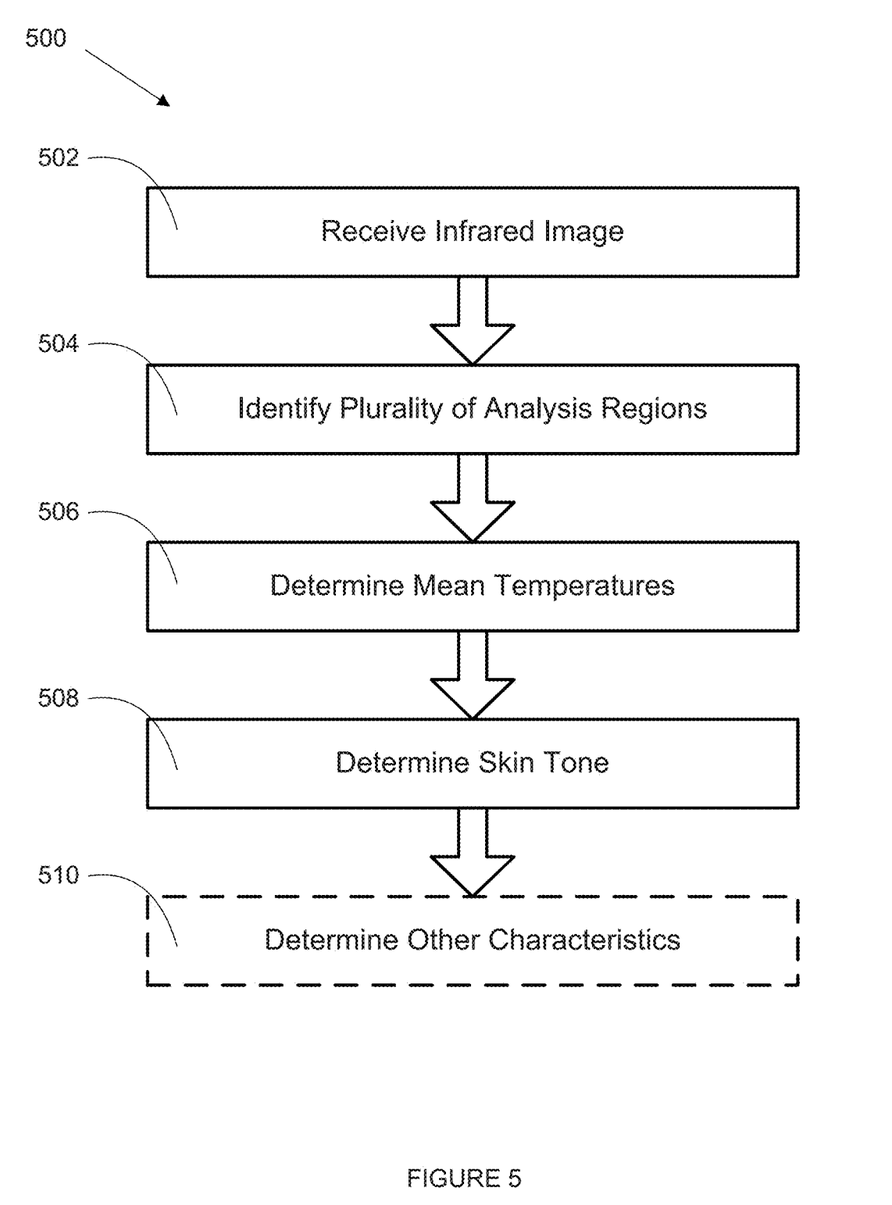
FIG. 5 illustrates an example facial recognition process, according to various embodiments.

Referring now to FIG. 5, an example facial recognition process 500, according to various embodiments, is shown. The process 500 may be performed by an analysis circuitry, such as analysis circuitry 104 of FIG. 1.

The process 500 may include block 502 where an infrared image of the subject is received. The infrared image may be captured by an infrared capture device, such as the infrared capture device 102 of FIG. 1.

The process 500 may include block 504 wherein a plurality of analysis regions are identified for facial recognition analysis. The analysis regions may correspond to a face of the subject within the infrared image. The subject's face may be identified based on any of the methods described throughout this disclosure, including the method of identifying the subject discussed in relation to the infrared image 200 of FIG. 2. In other embodiments, the subject's face may be identified based on an image captured by an image capture device, such as the image capture device 106 of FIG. 1.

The plurality of analysis regions may be a single analysis region corresponding to a portion or a whole of the subject's face or multiple analysis regions, each corresponding to different portions of the subject's face. The location or locations of the plurality of analysis regions may be identified, selected, and/or determined based on an outline of the subject, an outline of the subject's face, certain physical features of the subject, or some combination thereof.

The process 500 may include block 506 wherein respective mean temperatures are determined for the plurality of analysis regions. The respective mean temperatures may be determined in accordance with any of the methods described throughout this disclosure for determining mean temperatures, including the method for determining a mean temperature described in relation to the infrared image 200 of FIG. 2. In some embodiments, a mean temperature for the subject's face may be determined. The mean temperature of the subject's face may be determined by calculating a mean temperature of the respective mean temperatures of the plurality of analysis regions and/or may be determined based on a weighted mean of the respective mean temperatures.

The process 500 may include block 508 wherein a skin tone of the subject is determined based the respective mean temperatures of the plurality of analysis regions, the mean temperature of the subject's face, or some combination thereof. The skin tone may be determined in accordance with any of the methods described throughout this disclosure relating to determining skin tone, including the methods described in relation to the analysis circuitry 104 of FIG. 1 and/or the methods described in relation to the infrared image 200 of FIG. 2.

In some embodiments, the process 500 may include optional block 510 wherein other characteristics of the subject are determined. The other characteristics may include an age of the subject 202, a gender of the subject 202, a race and/or ethnicity of the subject 202, a health of the subject 202, an identity of the subject 202, or some combination thereof. Determining the other characteristics may be performed by analysis circuitry, such as the analysis circuitry 104, and may include analyzation of additional data or images, such as the images captured by the image capture device 106 of FIG. 1, data or images retrieved from the server 108 of FIG. 1, and/or the additional facial recognition data 404 of FIG. 4.

Figure 6:
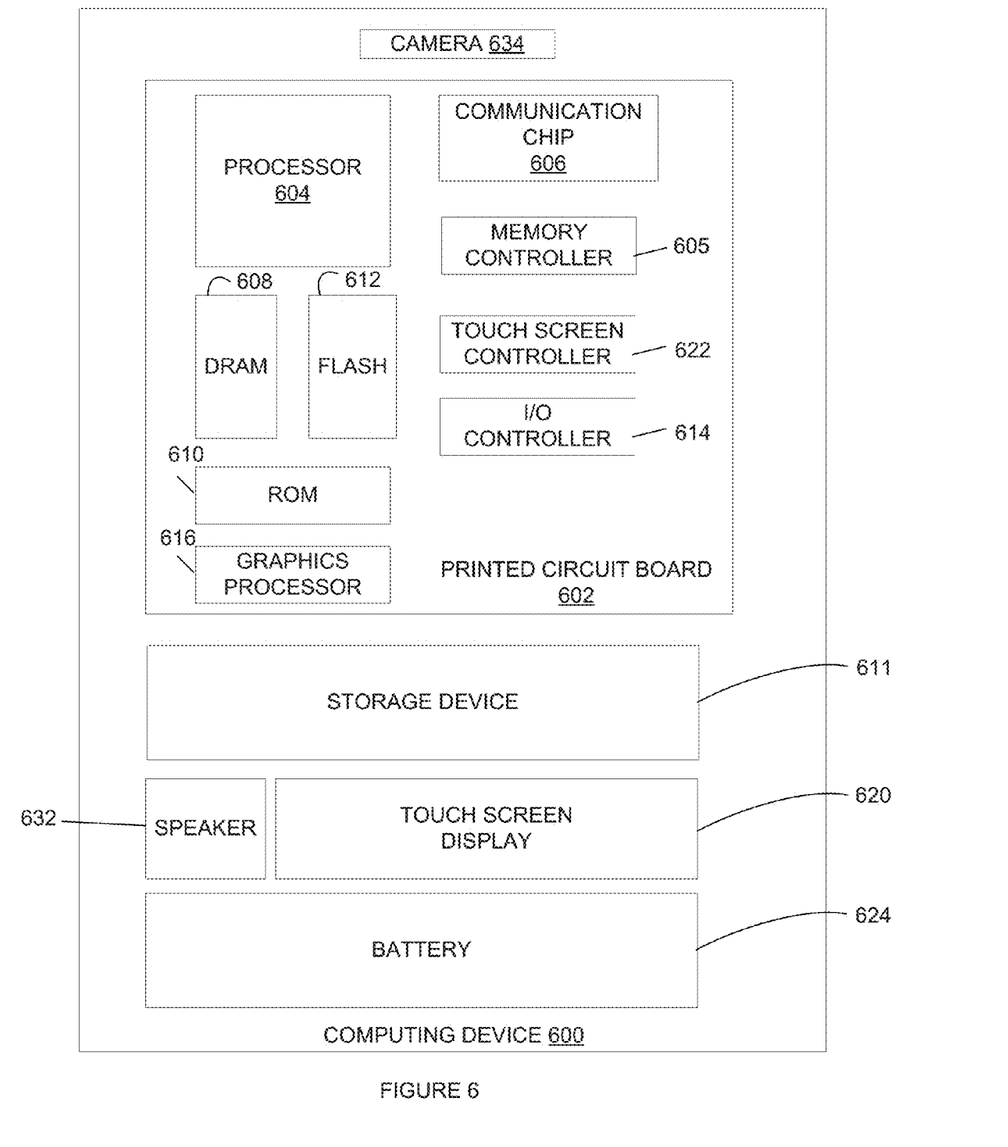
FIG. 6 illustrates an example computing device that may employ the apparatuses and/or methods described herein.

FIG. 6 illustrates an example computing device 600 that may employ the apparatuses and/or methods described herein (e.g., facial recognition system 100 of FIG. 1, the facial recognition arrangement 400 of FIG. 4, and/or the facial recognition process 500 of FIG. 5), in accordance with various embodiments. As shown, computing device 600 may include a number of components, such as one or more processor(s) 604 (one shown) and at least one communication chip 606. In various embodiments, the one or more processor(s) 604 each may include one or more processor cores. In various embodiments, the at least one communication chip 606 may be physically and electrically coupled to the one or more processor(s) 604. In further implementations, the communication chip 606 may be part of the one or more processor(s) 604. In various embodiments, computing device 600 may include printed circuit board (PCB) 602. For these embodiments, the one or more processor(s) 604 and communication chip 606 may be disposed thereon. In alternate embodiments, the various components may be coupled without the employment of PCB 602.

Depending on its applications, computing device 600 may include other components that may or may not be physically and electrically coupled to the PCB 602. These other components include, but are not limited to, memory controller 605, volatile memory (e.g., dynamic random access memory (DRAM) 608), non-volatile memory such as read only memory (ROM) 610, flash memory 612, storage device 611 (e.g., a hard-disk drive (HDD)), an I/O controller 614, a digital signal processor (not shown), a crypto processor (not shown), a graphics processor 616, a display (not shown), a touch screen display 620, a touch screen controller 622, a battery 624, an audio codec (not shown), a video codec (not shown), an accelerometer (not shown), a gyroscope (not shown), a speaker 632, a camera 634, and a mass storage device (such as hard disk drive, a solid state drive, compact disk (CD), digital versatile disk (DVD)) (not shown), and so forth.

In some embodiments, the one or more processor(s) 604, flash memory 612, and/or storage device 611 may include associated firmware (not shown) storing programming instructions configured to enable computing device 600, in response to execution of the programming instructions by one or more processor(s) 604, to practice all or selected aspects of the methods described herein. In various embodiments, these aspects may additionally or alternatively be implemented using hardware separate from the one or more processor(s) 604, flash memory 612, or storage device 611.

In various embodiments, one or more components of the computing device 600 may include the facial recognition system 100 and/or the facial recognition arrangement 400 described herein. For example, the facial recognition system 100 and/or the facial recognition arrangement 400 may be included in I/O controller 614, processor 604, memory controller 605, and/or another component of computing device 600. In some embodiments, I/O controller 614 may interface with one or more external devices to receive a data signal associated with the facial recognition system 100 and/or the facial recognition arrangement 400.

The communication chips 606 may enable wired and/or wireless communications for the transfer of data to and from the computing device 600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 606 may implement any of a number of wireless standards or protocols, including but not limited to IEEE 702.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computing device 600 may include a plurality of communication chips 606. For instance, a first communication chip 606 may be dedicated to shorter range wireless communications such as Wi-Fi and Bluetooth, and a second communication chip 606 may be dedicated to longer range wireless communications such as GPS, EDGE, GPRS, CDMA, WiMAX, LTE, Ev-DO, and others.

In various implementations, the computing device 600 may be a wearable device, a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an appliance, a portable music player, or a digital video recorder. In further implementations, the computing device 600 may be any other electronic device that processes data.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

Example 1 may include an apparatus to perform facial analysis, comprising one or more processors and facial analysis circuitry to be operated by the one or more processors to receive an infrared image of a subject from an infrared capture device, identify a plurality of analysis regions of the infrared image, wherein the plurality of analysis regions correspond to portions of a face of the subject, and determine respective mean temperatures of the plurality of analysis regions and determine a skin tone of the subject based, at least in part, on the respective mean temperatures of the plurality of analysis regions.

Example 2 may include the apparatus of example 1, wherein the facial analysis circuitry to be operated by the one or more processors is further to identify an outline of the face of the subject in the infrared image and identify the plurality of analysis regions of the infrared image based, at least in part, on the outline of the face.

Example 3 may include the apparatus of any of the examples 1 and 2, wherein the facial analysis circuitry to be operated by the one or more processors is further to determine a characteristic of the subject based, at least in part, on the skin tone of the subject and additional data extracted from another image of the subject.

Example 4 may include the apparatus of example 3, wherein the another image is a visible light image, and wherein the facial analysis circuitry to be operated by the one or more processors is further to extract the additional data through analysis of the visible light image.

Example 5 may include the apparatus of any of the examples 1 and 2, wherein the facial analysis circuitry to be operated by the one or more processors is further to receive a visible light image of the subject, receive one or more visible light images of other subjects with similar skin tones to the skin tone of the subject, compare the visible light image of the subject with the one or more visible light images of the other subjects and determine at least one characteristic associated with the subject based, at least in part, on a result of the comparison.

Example 6 may include the apparatus of example 5, wherein the at least one characteristic includes an age of the subject.

Example 7 may include the apparatus of example 5, wherein the at least one characteristic includes a gender of the subject.

Example 8 may include the apparatus of any of the examples 1 and 2, wherein the facial analysis circuitry to be operated by the one or more processors is further to receive a visible light image of the subject and determine a race of the subject based, at least in part, on the skin tone of the subject and the visible light image of the subject.

Example 9 may include the apparatus of any of the examples 1 and 2, wherein the facial analysis circuitry to be operated by the one or more processors is further to identify the subject based, at least in part, on the infrared image and the skin tone of the subject.

Example 10 may include a method for facial recognition, comprising receiving, by an analysis circuitry, an infrared image of a subject from an infrared capture device, determining, by the analysis circuitry, respective mean temperatures of a plurality of analysis regions of the infrared image, determining, by the analysis circuitry, a mean temperature of a face of the subject, based at least in part on the mean temperatures of the plurality of analysis regions of the infrared image and determining, by the analysis circuitry, a skin tone of the subject based, at least in part, on the mean temperature of the face of the subject.

Example 11 may include the method of example 10, further comprising identifying, by the analysis circuitry, an outline of the face of the subject in the infrared image and identifying, by the analysis circuitry, the plurality of analysis regions of the infrared image based, at least in part, on the outline of the face.

Example 12 may include the method of any of the examples 10 and 11, further comprising determining, by the analysis circuitry, characteristics of the subject based, at least in part, on both the skin tone of the subject and additional data extracted from another image of the subject.

Example 13 may include the method of example 12, wherein the another image is a visible light image, and wherein the method further comprises extracting, by the analysis circuitry, the additional data through analysis of the visible light image.

Example 14 may include the method of any of the examples 10 and 11, further comprising receiving, by the analysis circuitry, a visible light image of the subject, receiving, by the analysis circuitry, one or more visible light images of other subjects with similar skin tones to the skin tone of the subject, comparing, by the analysis circuitry, the visible light image of the subject with the one or more visible light images of the other subjects and determining, by the analysis circuitry, characteristics associated with the subject based, at least in part, on a result of the comparing.

Example 15 may include the method of example 14, wherein the characteristics associated with the subject include an age of the subject.

Example 16 may include the method of example 15, further comprising receiving, by the analysis circuitry, a visible light image of the subject and determining, by the analysis circuitry, a race of the subject based, at least in part, on both the skin tone of the subject and the visible light image of the subject.

Example 17 may include the method of example 15, further comprising determining an identity of the subject based, at least in part, on the infrared image and the skin tone of the subject.

Example 18 may include one or more computer-readable media having instructions stored thereon, wherein the instructions, in response to execution by a device, cause the device to identify a plurality of analysis regions of an infrared image of a subject, wherein the plurality of regions correspond to a portion of a face of the subject in the infrared image, determine respective mean temperatures of the plurality of analysis regions of the infrared image, determine a mean temperature of a face of the subject based, at least partially, on the respective mean temperatures of the plurality of analysis regions of the infrared image and determine a skin tone of the subject based, at least partially, on the mean temperature of the face of the subject.

Example 19 may include the one or more computer-readable media of example 18, wherein the instructions further cause the device to determine a characteristic of the subject based, at least partially, on the skin tone of subject and additional data extracted from another image of the subject.

Example 20 may include the one or more computer-readable media of example 19, wherein the instructions further cause the device to extract the additional data through analysis of the another image of the subject captured by an optical camera.

Example 21 may include the one or more computer-readable media of any of the examples 18-20, wherein the instructions further cause the device to retrieve a visible light image of the subject, retrieve a visible light image of another subject with similar skin tone to the skin tone of the subject, compare the visible light image of the subject with the visible light image of another subject and determine a characteristic of the subject based, at least partially, on the comparison.

Example 22 may include the one or more computer-readable media of example 21, wherein the characteristic is an age of the subject.

Example 23 may include the one or more computer-readable media of any of the examples 18-20, wherein the instructions further cause the device to retrieve a visible light image of the subject and determine a race of the subject based, at least partially, on the skin tone of the subject and the visible light image of the subject.

Example 24 may include the one or more computer-readable media of any of the examples 18-20, wherein the instructions further cause the device to identify the subject based, at least partially, on the infrared image and the skin tone of the subject.

Example 25 may include an apparatus for facial recognition, comprising means for receiving an infrared image of a subject from an infrared capture device, means for determining respective mean temperatures of a plurality of analysis regions of the infrared image, means for determining a mean temperature of a face of the subject, based at least in part on the mean temperatures of the plurality of analysis regions of the infrared image and means for determining a skin tone of the subject based, at least in part, on the mean temperature of the face of the subject.

Example 26 may include the apparatus of example 25, further comprising means for identifying an outline of the face of the subject in the infrared image and means for identifying the plurality of analysis regions of the infrared image based, at least in part, on the outline of the face.

Example 27 may include the apparatus of any of the examples 25 and 26, further comprising means for determining characteristics of the subject based, at least in part, on both the skin tone of the subject and additional data extracted from another image of the subject.

Example 28 may include the apparatus of example 27, wherein the another image is a visible light image, and wherein the apparatus further comprises means for extracting the additional data through analysis of the visible light image.

Example 29 may include the apparatus of any of the examples 25 and 26, further comprising means for receiving a visible light image of the subject, means for receiving one or more visible light images of other subjects with similar skin tones to the skin tone of the subject, means for comparing the visible light image of the subject with the one or more visible light images of the other subjects and means for determining characteristics associated with the subject based, at least in part, on a result of the comparing.

Example 30 may include the apparatus of example 29, wherein the characteristics associated with the subject include an age of the subject.

Example 31 may include the apparatus of example 30, further comprising means for receiving a visible light image of the subject and means for determining a race of the subject based, at least in part, on both the skin tone of the subject and the visible light image of the subject.

Example 32 may include the apparatus of example 30, further comprising means for determining an identity of the subject based, at least in part, on the infrared image and the skin tone of the subject.

What is claimed is:

1. An apparatus to perform facial analysis, comprising:
one or more processors; and
facial analysis circuitry to be operated by the one or more processors to:
receive an infrared image of a subject from an infrared capture device;
identify a plurality of analysis regions of the infrared image, wherein the plurality of analysis regions correspond to portions of a face of the subject;

determine respective mean temperatures of the plurality of analysis regions;

determine a skin tone of the subject based, at least in part, on the respective mean temperatures of the plurality of analysis regions;

receive a visible light image of the subject;

receive one or more visible light images of other subjects with similar skin tones to the determined skin tone of the subject based on the respective mean temperatures of the plurality of the analysis regions;

compare the visible light image of the subject with the one or more visible light images of the other subjects with similar skin tones; and determine at least one characteristic associated with the subject based, at least in part, on a result of the comparison.

2. The apparatus of claim 1, wherein the facial analysis circuitry to be operated by the one or more processors is further to:

identify an outline of the face of the subject in the infrared image; and identify the plurality of analysis regions of the infrared image based, at least in part, on the outline of the face.

3. The apparatus of claim 1, wherein the facial analysis circuitry to be operated by the one or more processors is further to determine a characteristic of the subject based, at least in part, on the determined skin tone of the subject and additional data extracted from another image of the subject.

4. The apparatus of claim 3, wherein the another image is the visible light image of the subject, and wherein the facial analysis circuitry to be operated by the one or more processors is further to extract the additional data through analysis of the visible light image of the subject.

5. The apparatus of claim 1, wherein the at least one characteristic includes an age of the subject.

6. The apparatus of claim 1, wherein the at least one characteristic includes a gender of the subject.

7. The apparatus of claim 1, wherein the facial analysis circuitry to be operated by the one or more processors is further to:

determine a race of the subject based, at least in part, on the determined skin tone of the subject and the visible light image of the subject.

8. The apparatus of claim 1, wherein the facial analysis circuitry to be operated by the one or more processors is further to identify the subject based, at least in part, on the infrared image and the determined skin tone of the subject.

9. A method for facial recognition, comprising:

receiving, by an analysis circuitry, an infrared image of a subject from an infrared capture device;

determining, by the analysis circuitry, respective mean temperatures of a plurality of analysis regions of the infrared image;

determining, by the analysis circuitry, a mean temperature of a face of the subject, based at least in part on the mean temperatures of the plurality of analysis regions of the infrared image;

determining, by the analysis circuitry, a skin tone of the subject based, at least in part, on the mean temperature of the face of the subject;

receiving, by the analysis circuitry, a visible light image of the subject;

receiving, by the analysis circuitry, one or more visible light images of other subjects with similar skin tones to the determined skin tone of the subject based on the mean temperature of the face of the subject;

comparing, by the analysis circuitry, the visible light image of the subject with the one or more visible light images of the other subjects with similar skin tones; and determining, by the analysis circuitry, characteristics associated with the subject based, at least in part, on a result of the comparing.

10. The method of claim 9, further comprising:

identifying, by the analysis circuitry, an outline of the face of the subject in the infrared image; and identifying, by the analysis circuitry, the plurality of analysis regions of the infrared image based, at least in part, on the outline of the face.

11. The method of claim 9, further comprising:

determining, by the analysis circuitry, characteristics of the subject based, at least in part, on both the determined skin tone of the subject and additional data extracted from another image of the subject.

12. The method of claim 11, wherein the another image is the visible light image of the subject, and wherein the method further comprises extracting, by the analysis circuitry, the additional data through analysis of the visible light image of the subject.

13. The method of claim 9, wherein the characteristics associated with the subject include an age of the subject.

14. The method of claim 13, further comprising:

determining, by the analysis circuitry, a race of the subject based, at least in part, on both the determined skin tone of the subject and the visible light image of the subject.

15. The method of claim 13, further comprising determining an identity of the subject based, at least in part, on the infrared image and the determined skin tone of the subject.

16. One or more non-transitory computer-readable media having instructions stored thereon, wherein the instructions, in response to execution by a device, cause the device to:

identify a plurality of analysis regions of an infrared image of a subject, wherein the plurality of regions correspond to a portion of a face of the subject in the infrared image;

determine respective mean temperatures of the plurality of analysis regions of the infrared image;

determine a mean temperature of a face of the subject based, at least partially, on the respective mean temperatures of the plurality of analysis regions of the infrared image;

determine a skin tone of the subject based, at least partially, on the mean temperature of the face of the subject;

retrieve a visible light image of the subject;

retrieve a visible light image of another subject with similar skin tone to the determined skin tone of the subject based on the mean temperature of the face of the subject;

compare the visible light image of the subject with the visible light image of another subject with similar skin tone; and determine a characteristic of the subject based, at least partially, on the comparison.

17. The one or more non-transitory computer-readable media of claim 16, wherein the instructions further cause the device to determine a characteristic of the subject based, at least partially, on the determined skin tone of subject and additional data extracted from another image of the subject.

18. The one or more non-transitory computer-readable media of claim 17, wherein the instructions further cause the device to extract the additional data through analysis of the another image of the subject captured by an optical camera.

19. The one or more non-transitory computer-readable media of claim 16, wherein the characteristic is an age of the subject.

20. The one or more non-transitory computer-readable media of claim 16, wherein the instructions further cause the device to:
   determine a race of the subject based, at least partially, on the determined skin tone of the subject and the visible light image of the subject.

21. The one or more non-transitory computer-readable media of claim 16, wherein the instructions further cause the device to identify the subject based, at least partially, on the infrared image and the determined skin tone of the subject.

* * * * *